United States Patent
Boire et al.

[11] Patent Number: 6,045,896
[45] Date of Patent: Apr. 4, 2000

[54] GLAZING ASSEMBLY COMPRISING A SUBSTRATE PROVIDED WITH A STACK OF THIN LAYERS FOR SOLAR PROTECTION AND/OR THERMAL INSULATION

[75] Inventors: Philippe Boire, Paris; Fabrice Didier, Meudon La Foret; Jean-Michel Grimal, Poissy, all of France

[73] Assignee: Saint-Gobain Vitrage, Courbevoie, France

[21] Appl. No.: 08/989,465

[22] Filed: Dec. 12, 1997

[30] Foreign Application Priority Data

Dec. 12, 1996 [FR] France ................................. 96 15265

[51] Int. Cl.[7] .............................. B32B 17/10; B32B 27/40
[52] U.S. Cl. .......................... 428/216; 65/95; 204/192.23; 204/192.26; 204/192.27; 427/294; 428/336; 428/425.6; 428/428; 428/432; 428/433; 428/434; 428/450; 428/469; 428/472; 428/699; 428/701; 428/702
[58] Field of Search ..................................... 428/215, 216, 428/336, 428, 432, 433, 434, 450, 425.6, 469, 472, 699, 701, 702; 427/294; 204/192.23, 192.26, 192.27; 65/95

[56] References Cited

U.S. PATENT DOCUMENTS

| | | | |
|---|---|---|---|
| 4,010,304 | 3/1977 | Cohen | 428/213 |
| 4,565,719 | 1/1986 | Phillips et al. | 428/34 |
| 4,715,879 | 12/1987 | Schmitte et al. | 65/60.2 |
| 4,985,312 | 1/1991 | Furuya et al. | 428/627 |
| 5,514,454 | 5/1996 | Boire et al. | 428/216 |
| 5,618,579 | 4/1997 | Boire et al. | 427/166 |

FOREIGN PATENT DOCUMENTS

| | | |
|---|---|---|
| 0 638 528 | 2/1995 | European Pat. Off. . |
| 0 718 250 | 6/1996 | France . |

*Primary Examiner*—D. S. Nakarani
*Attorney, Agent, or Firm*—Oblon, Spivak, McClelland, Maier & Neustadt, P.C.

[57] ABSTRACT

A glazing assembly is provided made of at least one transparent substrate having a stack thereon that includes an alternation of n functional layers and n+1 coatings, wherein the functional layers have reflection properties in the infrared and/or solar radiation and wherein $n \geq 1$ and where, in order to maintain the quality of the stack when the substrate is subjected to a heat treatment step, at least one of the following must be satisfied:

- the coating placed on top of at least one of the functional layers includes at least one barrier layer providing a barrier to at least oxygen and water; and
- at least one absorbent or stabilizing layer made of a material capable of absorbing or stabilizing the constituent material of the functional layer forms a part of either the coating placed on top of the functional layer and under the barrier layer or the coating placed beneath the functional layer; and a method for production of the glazing assembly.

36 Claims, 1 Drawing Sheet

GLAZING ASSEMBLY COMPRISING A SUBSTRATE PROVIDED WITH A STACK OF THIN LAYERS FOR SOLAR PROTECTION AND/OR THERMAL INSULATION

BACKGROUND OF THE INVENTION

1. Field of the Invention

The invention relates to transparent substrates, in particular made of a rigid inorganic material such as glass, the said substrates being coated with a stack of thin layers comprising at least one layer having a metallic-type behaviour able to act on solar radiation and/or long-wavelength infrared radiation.

The invention relates more particularly to the use of such substrates to manufacture thermal-insulation and/or solar-protection glazing assemblies. These glazing assemblies are intended to equip both buildings and vehicles, with a view in particular to decreasing the air-conditioning load and/or to reducing excessive overheating caused by the ever growing extent of glazed surfaces in passenger compartments.

2. Discussion of the Background

A known type of multilayer stack for giving the substrates such properties consists of at least one metallic layer, such as a silver layer, which is placed between two coatings of dielectric material of the metal-oxide type. This stack is generally obtained by a succession of depositions carried out using a vacuum technique, such as sputtering, optionally assisted by a magnetic field. Two very thin metal layers may also be provided on either side of the silver layer, the subjacent layer acting as a tie layer for nucleation and the overlayer as a protective or "sacrificial" layer so as to prevent degradation of the silver if the oxide layer which is on top of it is deposited by sputtering in the presence of oxygen.

Stacks of this type, having one or two base layers of silver, are thus known from European Patents EP-0,611,213, EP-0,678,484 and EP-0,638,528.

Currently, there is an increasing demand for these low-emissivity or solar-protection glazing assemblies which have in addition characteristics inherent in the substrates themselves, in particular aesthetic characteristics (so that they can be shape), mechanical properties (so that they are stronger) or safety characteristics (so that they do not cause injury in the event of breakage). This requires the glass substrates to be subjected to heat treatments known per se, of the bending, annealing and toughening type. Laminated-type glazing assemblies intended to be fitted into vehicles, which are nowadays almost all curved and/or toughened, are particularly intended.

It is therefore necessary to adapt the multilayer stack in order to preserve the integrity of the functional layers of the silver-layer type, in particular to prevent their degradation. A first solution consists in significantly increasing the thickness of the thin metal layers, mentioned above, which surround the functional layers: in this way it is ensured that any oxygen likely to diffuse from the ambient atmosphere and/or migrate from the glass substrate at high temperature be "captured" by these metal layers, by oxidizing them, without it reaching the functional layer(s).

This solution is not without drawbacks: since the two metal layers readily oxidize "instead of" the silver layers, they lead in particular to a great increase in the light transmission $T_L$: it is thus possible to obtain a low-emissivity or solar-protection glazing assembly, which is curved or toughened, having a value of $T_L$ greater than 75 and up to 80%, though this value was much lower before the heat treatment. In particular, reference may be made to Patent Application EP-A-0,506,507 for the description of such a "toughenable" stack with a silver layer placed between a tin layer and a nickel-chrome layer. However, it is clear that the coated substrate before heat treatment was regarded only as a "semi-finished" product and the optical properties frequently made it unusable as such. It was therefore necessary to develop and manufacture, in parallel, two types of multilayer stack, one for the non-curved/non-toughened glazing assemblies and the other for glazing assemblies intended to be toughened or curved, which may complicate matters, in particular in terms of stock and production control.

An improvement proposed in Patent EP-0,718,250 has made it possible to overcome this constraint: the teaching of this document consists in designing a stack of thin layers such that its optical and thermal properties remained virtually unchanged, whether or not the substrate, once coated with the stack, underwent a heat treatment. Such a result is achieved by combining two characteristics:

on the one hand, provided on top of the functional layer(s) is a layer made of a material capable of forming a barrier to oxygen diffusion at high temperature, which material itself does not undergo chemical or structural modification at high temperature which would result in modification in its optical properties. This material may thus be silicon nitride $Si_3N_4$ or aluminium nitride AlN;

on the other hand, the functional layer(s) is (are) directly in contact with the subjacent dielectric coating, in particular zinc oxide ZnO.

Although this solution allows the substrate effectively to maintain a $T_L$ level and an appearance in external reflection which, after heat treatment, are quite constant, it is still capable of improvement, in that it has been observed with this type of stack that optical defects, sometimes visible to the naked eye, could appear after heat treatment, these very often being in the form of a speckling of bright spots of the "pinhole" type or having a slightly fuzzy appearance, which is obviously prejudicial in terms of the aesthetic appearance and of productivity since this may lead to an abnormally high scrap rate, most particularly if these glazing assemblies are curved/toughened glazing assemblies, which may or may not be of the laminated type, intended for fitting into vehicles of the motor-vehicle type, in which very strict standards impose a very high optical quality.

SUMMARY OF THE INVENTION

The object of the invention is therefore to succeed in remedying this drawback, in particular by developing a novel type of stack having a functional layer or layers, of the type of those described previously, which stack is able to undergo high-temperature heat treatments of the bending/toughening or annealing type, while preserving its optical quality.

DETAILED DESCRIPTION OF THE PREFERRED EMBODIMENTS

Figure 1:
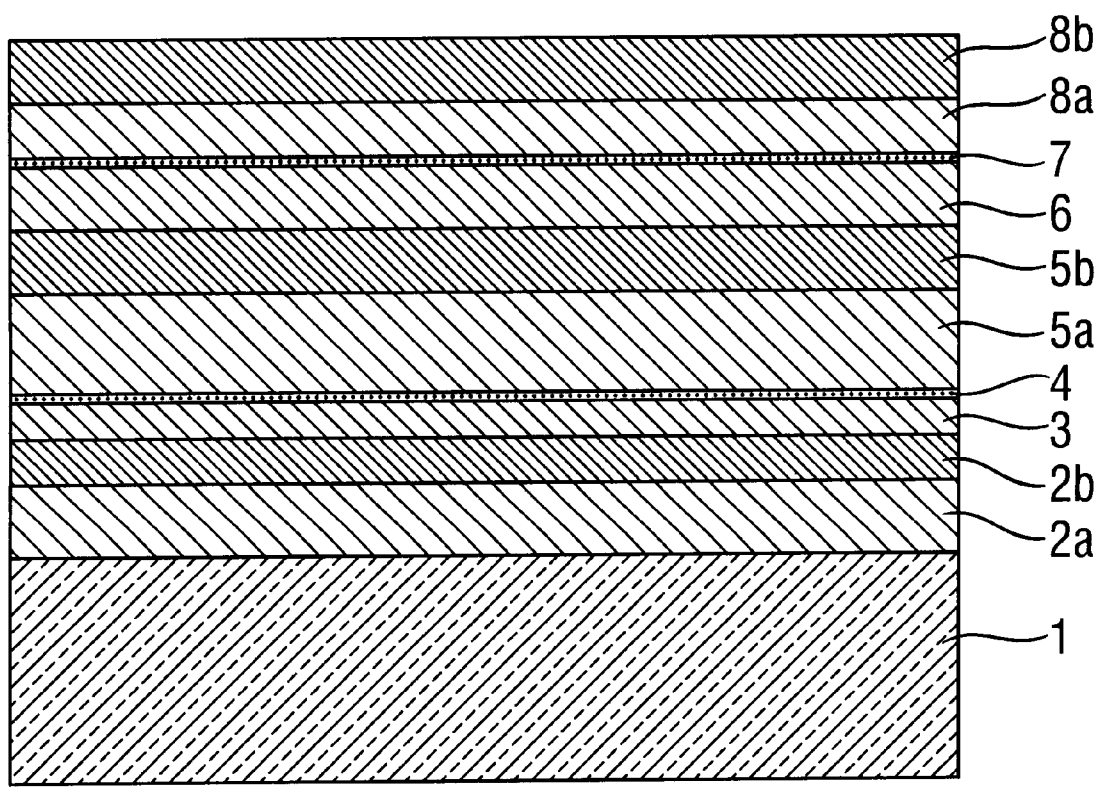
FIG. 1 shows a stack according to the present invention (note the proportions between the layer thickness are not shown to scale).

The subject of the invention is a glazing assembly comprising at least one transparent substrate provided with a stack of thin layers which includes an alternation of n functional layer(s) having reflection properties in the infrared and/or in solar radiation, in particular of an essentially metallic nature, and of (n+1) "coatings", with $n \geq 1$. The said "coatings" are composed of a layer or a plurality of layers, at least one of which is made of a dielectric material. These functional layers and these coatings are arranged so that the (each) functional layer is placed between two coatings.

With a view to preserving the optical quality of the stack in the case where the substrate once provided with the stack is subjected to a heat treatment of the toughening, bending, annealing type:

on the one hand, the coating placed on top of the functional layer, or on top of one of the functional layers, and in the latter case preferably the nth layer, includes at least one "barrier" layer made of a material capable of forming a barrier at least to oxygen and water; and on the other hand, at least one "absorbent" or "stabilizing" layer made of a material capable of "absorbing" or "stabilizing" the constituent material of the said functional layer forms part of:

either the coating placed on top of the functional layer and under the "barrier" layer;

or the coating placed under the said functional layer.

Preferably, the barrier layer is made of a material capable of also forming a barrier to the constituent material of the functional layer.

The inventors have in fact demonstrated that the appearance of optical defects after heat treatment of this type of stack of thin layers arose essentially from the migration of part, even a very small part, of the constituent material of the functional layer into the layers which are adjacent to it. The term "constituent material" is understood to mean, when the layer is metallic, both the metal element in question and the possibly totally or partially ionized metal. Thus, when the functional layer is made of silver, the migration of silver both in the form of Ag and $Ag^+$ into the upper layers, i.e. those placed on top of it, was observed, this migration resulting in the formation of silver "clusters" on the surface of the stack, creating an unattractive speckling.

Two reasons for this migration have been proposed—on the one hand, a mechanical reason and, on the other hand, a chemical reason.

From the mechanical standpoint, when the stack is heated to high temperature, in particular within the temperature range of from 550 to 650° C. which is necessary for the usual operations of bending and/or toughening the glazing assemblies, all the materials making up the thin layers "react differently" to this thermal stress. The functional layer made of metal of the silver type will expand greatly and, in general, more than the other layers of the stack, in particular those based on a dielectric which are contiguous with it. The functional layer will therefore be in a high state of compression at high temperature, and the silver, in metallic and/or ionic form, then tends to embrittle, with a decrease in the adhesion of the layer to the contiguous layers, until it has a tendency to migrate into the other layers in order to relieve the thermomechanical stress to which it is subjected.

From the chemical standpoint, if this time the adjacent layers, and more particularly the layers placed on top of it, are not capable of completely blocking this migration, the optical defects mentioned above then appear. This may be the case when there are, as dielectric coatings placed on top of the functional layer, known materials of the metal-oxide type, or even materials chosen for forming an oxygen barrier so as to prevent the migration of oxygen from the outside into the functional layer, as is the case with $Si_3N_4$.

The invention therefore consisted in providing a double protection for the functional layer of the silver type.

It was important to continue to provide on top of the functional layer at least one layer made of a material capable of preventing the migration of oxygen and water from the ambient atmosphere into the functional layer, this diffusion rising from the atmosphere proving to be of greater magnitude and markedly more prejudicial to the integrity of the functional layer than the possible migration of oxygen which stemmed this time from the glass. (However, provision may also be made, for maximum safety, also to place this type of "barrier" layer under the functional layer). This thus avoids any chemical modification of the functional layer, in particular by oxidation/hydration, which would decrease its thermal performance characteristics and would call into question its optical quality, this chemical degradation phenomenon being uncontrollable.

However, the invention adds to this first protection, according to a first variant, a means for capturing, and absorbing the silver which would tend to migrate out of the layer, this being achieved with the aid of a layer capable of receiving a certain amount of constituent material of the functional layer which is "in excess" under the thermomechanical stress. This so-called "absorbent" layer thus makes it possible to stop the migration into the other layers of the stack as far as the external atmosphere.

Its place in the stack can be varied. If it is placed on top of the functional layer, it is preferable, in order for it to be able to fulfil its role, for it to be under the barrier layer mentioned previously in order to prevent there being any migration through the barrier layer, creating the optical defects mentioned previously, i.e. the formation of "clusters" of material coming from the functional layer, in particular silver, which are responsible for the unattractive speckling. However, provision may also be made for it to be placed under the functional layer.

In fact, the "absorbent" layer is to be chosen so that it preferably has at least two properties: it is important, on the one hand, that the material of which it is composed has a good chemical affinity with the material of the functional layer and, on the other hand, that the material of the absorbent layer is able to capture the "excess" material of the functional layer, it being possible for the method of incorporating this "excess" material to be carried out in various ways, in particular by incorporation of the interstitial type or of the vacancy type.

According to a second variant, it is preferred to use not an "absorbent" layer but rather a "stabilizing" layer. In the sense of the invention, "stabilizing" means that the nature of the layer in question is selected so as to stabilize the interface between the functional layer and this layer. This stabilization leads to an increase in the adhesion of the functional layer to the layers which surround it, and thus resists the migration of its constituent material generally in a direction taking it away from the carrier substrate.

It has turned out that one particularly advantageous material for forming this "stabilizing" layer is zinc oxide, preferably placed on top of the functional layer in order to resist in an optimum manner the diffusion from the opposite side of the stack from the glass substrate, either directly or via a thin metal layer of the sacrificial type (the thickness is generally about 0.5 to 2 nm). (It may also be under the functional layer, preferably directly in contact with it). This ZnO-based "stabilizing" layer advantageously has a thickness of at least 5 nm, in particular between 5 and 25 nm.

The invention applies not only to stacks having only a single "functional" layer placed between two coatings. It also applies to stacks which include a plurality of functional layers, in particular two functional layers alternating with three coatings, of the type described, for example, in Patent EP-0,638,528, or three functional layers alternating with four coatings, of the type described, for example, in Patent EP-0,645,352.

If the stack thus uses several functional layers, it has proved to be the case that it was often advantageous for the last functional layer, the one furthest away from the carrier substrate, of the stack to be provided both with a barrier layer and with an absorbent or stabilizing layer, as it seems that it was the latter which was most "exposed" because of its position in the stack, in the sense that it was the most likely to be oxidized by the ambient atmosphere and the one from which part of its constituent material could migrate the most easily as far as the external surface of the last layer of the stack.

Of course, provision may be made for all the functional layers to be thus provided with a barrier layer and with an absorbent or stabilizing layer according to the invention, in particular made of silver or a metal alloy containing silver.

The barrier layer according to the invention is preferably chosen from dielectric materials whose refractive index is advantageously similar to those normally used in this type of stack, i.e. lying in particular between 1.7 and 2.5. It may thus "optically" replace the dielectric layers of the metal-oxide type and combine an interferential optical function with a barrier function.

The barrier layer is, in particular, based on silicon compounds of the silicon oxide $SiO_2$, silicon oxycarbide $SiO_xC_y$ or silicon oxynitride $SiO_xN_y$ type. It may also be based on nitrides, of the silicon nitride $Si_3N_4$ or aluminium nitride AlN type, or a mixture of at least two of these compounds.

It may also be chosen to be of the carbide type, such as SiC, TiC, LiC and TaC, but then it is preferred to limit it to thicknesses which are not too great, because of their absorbent character which may penalize the stack in terms of the level of light transmission $T_L$ if it is desired to obtain a glazing assembly with a high $T_L$.

In general, the geometrical thickness of the barrier layer is otherwise preferably selected, so that it is at least 10 nm, in particular at least 15 nm or especially between 15 and 60 nm or more especially between 20 and 50 nm.

Let us now turn our attention to the arrangement in the stack and to the nature of the absorbent layer according to the first variant of the invention. It has been seen that it must enable the state of compression of the functional layer at high temperature to be reduced by allowing part of its material, particular in metallic or ionic form, to be incorporated. It may be placed either directly in contact with the functional layer, under it or on top of it, or it is separated from it by at least one "interlayer" which is "permeable" to the migration of the material in metallic or ionic form at high temperature, without this resulting in a chemical or structural modification of the said interlayer having a prejudicial impact on the optical appearance of the stack in its entirety. This interlayer or these interlayers, able to be between the functional layer and the absorbent layer are in particular the thin metal layers which serve as nucleation layers or as sacrificial layers with respect to the functional layer.

According to a first embodiment, the material of the absorbent layer is chosen from a porous material, in particular a layer having a porosity of at least 2% and preferably between 5 and 25%. Porosity is defined here by the relationship p %=1−($d_1/d_0$), where $d_0$ is the theoretical density of the material in question as a percentage and $d_1$ its actual density. This porosity is often manifested when the material is a dielectric, by a reduction in its refractive index compared to its theoretical index, approximately in the same proportions as its density. In order to provide a sufficient absorption capacity, provision is generally made for this porous layer to have a geometrical thickness of at least 2 nm, in particular between 2 and 30 nm; it is possible to vary both the porosity and the thickness in order to obtain the desired effect of complete absorption of the material of the functional layer which is "in excess".

According to a first case, this porous layer may be essentially metallic, in particular made of a material chosen from at least one of the following metals: Ni, Cr, Nb, Sn, Ti, an alloy of the NiCr type or steel. In this case, it is preferable to limit its thickness to a range of from 2 to 5 nm, as its optically absorbent nature would, if a thicker layer were to be chosen, decrease the level of light transmission too significantly when it is desired to have a highly transparent glazing assembly.

According to a second case, the porous layer is chosen from a dielectric material, in particular a material chosen from at least one of the following oxides: zinc oxide ZnO, titanium oxide $TiO_2$, silicon oxide $SiO_2$ and aluminium oxide $Al_2O_3$. In this case, the layer may be appreciably thicker and also fulfil its interferential role in the stack.

The porosity of these various materials may be varied by adjusting the deposition conditions. Thus, when these layers are deposited by sputtering, optionally assisted by a magnetic field, the choice of the pressure within the deposition chamber makes it possible to control the porosity of the layer: the higher the pressure of the inert gas, of the argon type, the greater the tendency for the porosity to increase.

According to a second embodiment, the material of the absorbent layer consists of a material capable of reversibly or irreversibly inserting the ions of the metal of the functional layer, and possibly the unionized metal, and possibly ionizing the material at the moment of inserting it. This is in particular a material based on at least one of the following components: tungsten oxide $WO_3$, nickel oxide $NiO_x$, niobium oxide $NbO_x$, iridium oxide $IrO_x$, tin oxide $SnO_x$, and vanadium oxide $VO_x$, it being possible for these oxides to be substoichiometric in terms of oxygen, and either hydrated or non hydrated. In fact, these materials, in particular tungsten oxide, are well-known for their properties of reversibly inserting cations of the $Ag^+$ type in electrochromic windows or devices.

The thickness of this type of insertion layer can be varied, in particular depending on its intrinsic insertion capacity with respect to each of the materials mentioned. Preferably a layer of at least 1 nm, in particular between 1 and 50 nm, preferably between 2 and 30 nm, is provided.

According to a third embodiment, the absorbent layer essentially consists of a metal (or of a metal alloy) capable of forming a defined or non-defined solid solution with the metal of the functional layer when it is metallic. Mention may be made in particular of at least one of the following metals or metalloids: Cu, Pd, Zn, Au, Cd, Al and Si. The term "solid solution is understood to mean here an association which is not necessarily strictly speaking an alloy, but one in which the metal of the absorbent layer can "dissolve" a certain amount of the metal of the functional layer into its matrix, forming a compound which may be of undefined stoichiometry, i.e. a metal which can incorporate a variable amount of metal of the functional layer, an amount "starting" from 0% and able to increase progresslively.

Provision may also be made for the materials of the second and third embodiments to have a porosity such as that defined in the first embodiment.

Advantageously, provision may be made for at least one of the functional layers to be surmounted by a thin "sacrificial" metallic layer which is at least partially oxidized, in particular having a thickness of from 0.5 to 4 nm: the latter makes it possible to preserve the functional layer from oxidation, during the deposition of the stack, when the next layer is based on an oxide deposited by reactive sputtering in the presence of oxygen. The "sacrificial" layer thus oxidizes in place of the metal of the functional layer.

Provision may therefore be made for the metallic-type absorbent layer, in particular one which is porous and/or capable of forming a solid solution, to be placed directly on top of the functional layer and therefore also to act as a "sacrificial" layer. In this case, it must be sufficiently thick so that, after it has oxidized during the deposition of the upper layer, there remains a sufficient thickness of non-oxidized metal capable of fulfilling its role as an absorber.

Advantageously, the stack comprises two functional layers, with each of which are associated a barrier layer and an absorbent or stabilizing layer.

In the stack, the barrier layer or at least one of the barrier layers may constitute the essential aspect of the coating in the sense of the invention. It may also be combined with other layers of dielectric material and may, in particular, be surmounted by at least one other layer based on a metal oxide or oxides, such as zinc oxide ZnO, tin oxide $SnO_2$, titanium oxide $TiO_2$, niobium oxide $Nb_2O_5$, tantalum oxide $Ta_2O_5$, aluminium oxide $Al_2O_3$ and tungsten oxide $WO_3$, or any mixture of at least two of these oxides. There are in particular two ways of carrying out the deposition of this oxide layer: either, in the usual way, directly in the form of oxide or, in particular when it constitutes the final layer of the stack, in the metallic form, its oxidation then being carried out after its deposition, most particularly during the heat treatment in air of the substrate. Its thickness is preferably chosen to be between 0.5 and 20 nm, in particular between 1 and 5 nm, but of course it remains optional. The reasons may be many, in particular they may take into account the rate of deposition of these layers, the cost of the raw materials (the targets if a sputtering deposition technique is used) and the refractive indices. The judicious choice of the layer or layers surmounting the barrier layer may also take into account the optimization of the adhesion of the stack to the sheet of thermoplastic polymer of the polyvinyl butyral PVB type when the substrate coated with the stack is mounted with a laminated glazing assembly. (In this regard, the teaching of Patent EP-0,433,136 may thus be indicated). This choice may also take into account the chemical-corrosion and/or mechanical problems that the stack may have to overcome, for example depending on the atmosphere with which it will come into contact, either during the process for manufacturing the glazing assembly (for example, the atmosphere during the heat treatment) or while it is being stored or once it has been installed.

Moreover, provision may also be made for the functional layer, or at least one of the functional layers, to be placed on a coating, the final layer of which facilitates wetting of the functional layer. This may more particularly be a wetting layer based on zinc oxide ZnO, niobium oxide $Nb_2O_5$ or tantalum oxide $Ta_2O_5$, or a sequence of two layers of this type. For further details, reference may be made to Patents EP-0,611,213 and EP-0,678,434. It is not excluded for these wetting layers, by choosing them so as to be porous, also to be able to fulfil the role of absorbent layers or, by selecting their thickness and their configuration, that of stabilizing layers.

According to one embodiment of the invention, at least one of the functional layers is surmounted by a coating comprising the sequence absorbent or stabilizing layer/ barrier layer of the $SnO_2/Si_3N_4$ or $WO_3/Si_3N_4$ or $ZnO/Si_3N_4$ type, it being possible for $Si_3N_4$ to be replaced, for example, by AlN or by a mixture of AlN and $Si_3N_4$.

The glazing assembly according to the invention may also be such that, in particular in the case of a stack having two silver-based functional layers, at least one of these layers, in particular the final one, is on top of a coating comprising the sequence $ZnO/Si_3N_4/ZnO$.

This glazing assembly may also be such that at least one of the functional layers, in particular the first one, is on top of a coating comprising the sequence $SnO_2/ZnO$ or $Si_3N_4/ZnO$.

According to a second embodiment, there is this time a sequence of the absorbent or stabilizing layer/functional layer/barrier layer type (possibly with "interlayers" on either side of the functional layer) with, in particular, a layer of $SnO_2$ or $WO_3$ or ZnO under the functional layer and a layer of $Si_3N_4$ and/or AlN on top of the functional layer.

The glazing assembly according to the invention includes at least the substrate carrying the stack, possibly combined with at least one other substrate. They may all be clear, or coloured, particularly at least one of the substrates may be made of bulk-coloured glass. The choice of the type of coloration will depend on the level of light transmission and/or on the colorimetric appearance which are desired for the glazing assembly once its manufacture has been completed. Thus, for glazing assemblies intended for fitting into vehicles, standards demand that the windscreen have a light transmission $T_L$ of approximately 75%, such a level of transmission not being required for the side windows or the sun-roof, for example. The tinted glasses which may be adopted are, for example, those which, for a thickness of 4 mm, have a $T_L$ of from 65% to 95%, an energy transmission $T_E$ of from 40% to 80% and a dominant wavelength in transmission of from 470 nm to 525 nm combined with a transmission purity of from 0.4% to 6% using the $D_{65}$ illuminant, which may be "manifested" in the (L, a*, b*) colorimetry system by values of a* and b* in transmission of, respectively, between −9 and 0 and between −8 and +2.

These may be the glasses sold under the name PARSOL by Saint-Gobain Vitrage, in particular those having a verdigris tint. They may also be glasses of the so-called "TSA" range which are also sold by Saint-Gobain Vitrage, and glasses whose composition and properties are in particular described in Patents EP-0,616,883, EP-0,644,164, EP-0,722,427 and WO-96/00394.

The glazing assembly according to the invention may have a laminated structure, combining in particular at least two rigid substrates of the glass type using at least one sheet of a thermoplastic polymer, so as to have a structure of the glass/stack of thin layers/sheet(s)/glass type. In particular, the polymer may be based on polyvinyl butyral PVB, ethylene-vinyl acetate EVA, polyethylene terephthalate PET or polyvinyl chloride PVC.

The glazing assembly may also have a so-called laminated-glazing structure which combines a rigid substrate of the glass type with at least one sheet of polymer of the polyurethane type having energy absorption properties, optionally combined with another layer of polymers having "self-healing" properties. For more details on this type of glazing assembly, reference may be made in particular to Patents EP-0,132,198, EP-0,131,523 and EP-0,389,354. The glazing assembly may then have a structure of the glass/ stack of thin layers/sheet(s) of polymer type.

The glazing assemblies according to the invention are capable of undergoing a heat treatment without damaging the stack of thin layers. They are therefore optionally curved and/or toughened. If they are curved, in particular for the purpose of forming windows for vehicles, the stack of thin layers is preferably on an at least partially non-planar face. In a laminated structure, it is preferably in contact with the sheet of polymer.

The glazing assembly may also be curved and/or toughened when it consists only of a single substrate, that provided with the stack. This is then referred to as a "monolithic" glazing assembly. The glazing assembly may also be a multiple-glazing unit, in particular a double-glazing unit, at least the substrate carrying the stack being curved and/or toughened. It is preferable in a multiple-glazing configuration for the stack to be placed so that it is on the side facing the sandwiched gas-filled cavity.

The glazing assemblies of the invention are, in a general way, preferably designed so as to have a light transmission value of from 50 to 85%, in particular from 60 to 80%, with values of reflection $R_L$ which are less than 20%, in particular less than 13%, and negative values of a and b in external reflection: it is thus possible in particular to "cover" the entire range of $T_L$ encountered in windows for vehicles, with, in external coloration, a tint more towards the bluegreens, this currently being judged to be quite aesthetic.

The invention also relates to the process for manufacturing the glazing assemblies, which may consist in depositing the stack of thin layers on its glass substrate using a vacuum technique of the sputtering type, optionally assisted by a magnetic field (without excluding the possibility that the first layer or first layers is or are deposited using another technique, for example using a thermal decomposition technique of pyrolysis type), and then in carrying out a heat treatment of the bending/toughening or annealing type on the coated substrate without impairing its optical quality.

EXAMPLES

The details and advantageous characteristics of the invention will emerge from the following non-limiting examples illustrated by means of FIG. 1.

FIG. 1 shows a stack according to the invention, but the proportions between the thicknesses of the various materials are not respected so that it is easier to examine it.

In all the examples which follow, the stack is deposited on the substrate 1, which is a substrate made of clear silica-soda-lime glass 2 mm in thickness. The stack is decomposed into two silver functional layers 3, 6 with identical thicknesses or with different thicknesses, the first layer 3 having a smaller thickness than that of the second layer 6 in accordance with the teaching of Patent EP-0,638,528. A thin at least partially oxidized metallic "sacrificial" layer 4, 7 is deposited on each of the functional layers 3, 6.

Under each of the functional layers 3, 6 is a layer or a plurality of superimposed layers based on a dielectric material, these layers being referenced 2a, 2b and 5a, 5b.

On the final functional layer 6, counting from the substrate, and on top of the sacrificial layer 7, there is a layer or a superposition of layers of dielectric material 8a, 8b.

There is therefore a structure using a first coating which combines the layers 2a and 2b and a silver layer 3, a second coating which combines the layers 4, 5a and 5b and a second silver layer 6, and a third coating which combines the layers 7, 8a and 8b.

According to a first series of examples, Examples 1 to 3:
the sacrificial layers 4, 7 are made of Nb
the layers 2a are made of $SnO_2$
the layers 5a are made of $Si_3N_4$
the layers 5b are made of ZnO
the layers 8b are made of $Si_3N_4$ and
the layers 3, 6 are made of silver.

In the various examples, only the nature of layer 8a changes. In the sense of the invention, the $Si_3N_4$ layers 5a and 8b fulfil the role of oxygen-barrier layers with respect to the silver layers 3 and 6, respectively, the "absorbent" layer in the sense of the invention being the layer 8a, which is therefore capable of absorbing a certain amount of silver migrating from the silver layer 6 on top of (or beneath) which it is deposited.

In all these examples, the layers of the stack are successively deposited by sputtering assisted by a magnetic field, but any other deposition technique may be envisaged as long as it allows good control of the thicknesses of the layers to be deposited.

The deposition apparatus comprises at least one sputtering chamber provided with cathodes fitted with targets made of the appropriate materials under which the substrate 1 passes in succession. These deposition conditions for each of the layers are as follows:

the silver-based layers 3, 6 are deposited using a silver target, at a pressure of 0.8 Pa in an argon atmosphere, the $SnO_2$-based layers 2a are deposited by reactive sputtering using a tin target, at a pressure of 0.8 Pa and in an argon/oxygen atmosphere having 36% of oxygen by volume, the Nb-based layers 4, 7 are deposited using a niobium target, again at the same pressure and in an argon atmosphere, the $Si_3N_4$ layers 5a, 8b are deposited by reactive sputtering using a silicon target doped with boron or with aluminium, at a pressure of 0.8 Pa in an argon/nitrogen atmosphere having 20% of nitrogen by volume, and the ZnO layers 2b and 5b are deposited by reactive sputtering using a zinc target, at the same pressure and in an argon/oxygen atmosphere having 40% of oxygen by volume.

The power densities and the run speeds of the substrate 1 are adjusted in a known manner in order to obtain the desired layer thicknesses.

Example 1

In this example, the layer 8a is made of tungsten oxide $WO_3$ obtained by the reactive sputtering of a W target at a pressure of 0.8 Pa in an argon/oxygen atmosphere having 20% of oxygen by volume.

Example 2

In this example, the layer 8a is made of "porous" zinc oxide deposited at a pressure of 1.2 Pa, significantly greater than that envisaged for the layers 2b and 5b. Its measured porosity is 15%.

Example 3

In this example, the layer 8a is made of $SnO_2$ deposited like the layer 2a.

Table 1 below specifies, for each of the three examples, the nature and the thicknesses (in nanometers) of the layers of the stack in question.

TABLE 1

|  |  | EXAMPLE 1 | EXAMPLE 2 | EXAMPLE 3 |
|---|---|---|---|---|
| Glass | (1) | — | — | — |
| SnO$_2$ | (2a) | 20 | 20 | 20 |
| ZnO | (2b) | 17 | 17 | 17 |
| Ag | (3) | 9 | 9 | 9 |
| Nb | (4) | 0.7 | 0.7 | 0.7 |
| Si$_3$N$_4$ | (5a) | 65 | 65 | 65 |
| ZnO | (5b) | 25 | 25 | 25 |
| Ag | (6) | 9 | 9 | 9 |
| Nb | (7) | 0.7 | 0.7 | 0.7 |
| Layer 8a | (8a) | (WO$_3$): 2 | (ZnO): 2 | (SnO$_2$): 2 |
| Si$_3$N$_4$ | (8b) | 37.5 | 37.5 | 37.5 |

Next, each of these coated substrates was subjected to a heat treatment above 620° C., then curved and joined to a substrate of the same kind, but uncoated, and having the same curvature by means of a thermoplastic sheet of polyvinyl butyral 0.80 mm in thickness by hot calendering in a known manner so as to have a laminated substrate(1)/multilayer/PVB/substrate(2) structure, with the face of the substrate 1 on which is placed the multilayer stack which is non-planar, in a fitting of the motor-vehicle windscreen type.

Table 2 below indicates, for each of these examples:

A. the light transmission $T_L$ in % ($D_{65}$ illuminant),
  the energy transmission $T_E$ in %,
  the values of a* and b* in the (L, a*, b*) colorimetry system in transmission, a* (T) and b* (T),
  the external light reflection $R_L$ in % ($D_{65}$ illuminant), and
  the values of a* and b* in the (L, a*, b*) colorimetry system in reflection, a* (R) and b* (R), on the one hand, for the coated substrates (1) before bending and laminating ("monolithic") and, on the other hand, for the coated substrates (1) once they have been curved and assembled into a laminated glazing assembly ("laminated").

TABLE 2

|  | $T_L$ | $T_E$ | a*(T) | b*(T) | $R_L$ | a*(R) | b*(R) |
|---|---|---|---|---|---|---|---|
| Example 1 | | | | | | | |
| monolithic | 80 | 51 | -2.1 | 1.9 | 5 | -1 | -1.5 |
| laminated | 75 | 42 | -2.9 | 5.9 | 11 | -1.7 | -16.6 |
| Example 2 | | | | | | | |
| monolithic | 60 | 51 | -2.1 | 1.9 | 5.5 | -1.1 | -1.5 |
| laminated | 75 | 41 | -3 | 5.7 | 10.5 | -2 | -14.7 |
| Example 3 | | | | | | | |
| monolithic | 80 | 51 | -2.1 | 1.9 | 5.5 | -1 | -1.5 |
| laminated | 75 | 41 | -3 | 5.7 | 11 | -2.2 | -14.5 |

Furthermore, the optical quality of the coated substrates once they have been curved is equivalent to the quality they had before heat treatment—there was no visible appearance of speckling or the appearance of any residual fuzziness.

The following conclusions may be drawn from these results:

even for very small thicknesses, the absorbent layers 8a, either of the "porous" type (ZnO) or of the Ag$^+$-insertion type (WO$_3$, SnO$_2$), are sufficiently effective for relaxing the stresses in the final silver layer 6, by absorbing the "excess" silver therein, and thus for eliminating the random optical degradation problems which could appear in similar stacks, but which do not have this type of layer;

the stack is not adversely affected, thermally or optically, by the "additional" absorbent layers: the glazing assemblies remain within the bluegreens in reflection (a* (R) and b* (R) are both negative), whether they are a "monolithic" or a "laminated" glazing assembly, and it is possible to maintain $T_L$ values of at least 75% in the laminated case, this being of importance in the motor-vehicle field when this type of glazing assembly is used as a windscreen, since the bending is a heat treatment, which may be regarded as being mechanically and thermally even more "stressful" than the toughening operation, it is therefore also possible, a fortiori, to use these glazing assemblies as non-curved toughened glazing assemblies, for example having a double-glazing structure used in buildings, and to obtain the same optical quality; and it should also be noted that the advantage of the stacks which are described in Patent EP-0,718,250 is maintained in the sense that the thermal operation of the glazing assembly not only preserves its optical quality (this was the object of the present invention) but furthermore, in particular because of the presence of the Si$_3$N$_4$ barrier layers, does not significantly modify its optical/thermal properties (the decrease in $T_L$ in the laminated assembly compared to the monolithic assembly arising, of course, from the addition of the sheet of PVB and the second glass).

An Example 4 was also produced, with certain modifications compared to the previous examples, modifications consisting essentially in using titanium-based layers (4) and (7) in adding a ZnO layer, called below layer (5a'), between the sacrificial layer (4) and the Si$_3$N$_4$-based layer (5a) and finally in using as layer (8a) a "stabilizing" layer made of non-porous (or hardly porous) Zno.

Table 3 below collates the succession of layers with their thicknesses in nm (the numbers in brackets also indicate the most advantageous range of thicknesses for each of the layers):

TABLE 3

|  |  | EXAMPLE 4 |
|---|---|---|
| Glass | (1) | — |
| SnO$_2$ | (2a) | 17 - (5–20) |
| ZnO | (2b) | 17 - (5–20) |
| Ag | (3) | 9 - (8–12) |
| Ti | (4) | 1 - (0.5–1.5) |
| ZNO | (5a') | 10 |
| Si$_3$N$_4$ | (5a) | 55 |
| ZnO | (5b) | 20 |
| Ag | (6) | 9 - (8–12) |
| Ti | (7) | 1 - (0.5–1.5) |
| ZnO | (8a) | 10 |
| Si$_3$N$_4$ | (8b) | 25 |

Preferably, the sum of the geometrical thicknesses of the layers (5a'+5a+5b) is between 70 and 90 nm and the sum of the geometrical thicknesses of the layers 8a and 8b is between 30 and 50 nm.

In this stack, there is again the Si$_3$N$_4$ barrier layer (8b), and a non-porous (or hardly porous) ZnO "stabilizing" layer (8a). The other non-porous or hardly porous ZnO layer (5a') may contribute to the stabilizing effect obtained by the ZnO layer (8a).

Table 4 below indicates the photometric values (already explained in the case of Table 2) of the substrate thus coated and then laminated under the same conditions as previously, with, in addition, the energy reflection value $R_E$ in percentages:

TABLE 4

| | EX. 4 (laminated) |
|---|---|
| $T_L$ | 80.5% |
| $T_E$ | 47% |
| a* (T) | −2.6 |
| b* (T) | 2.6 |
| $R_L$ | 9.5% |
| a* (R) | −2.0 |
| b* (R) | −7.8 |
| $R_E$ | 34.5 |

Another example, Example 4a, was produced by repeating the stack in Example 4 but by slightly modifying the chemical nature of the $Si_3N_4$ final layer (8a): in accordance with the teaching of Patent Application FR97/09223 of Jul. 21, 1997, this final layer was "doped" in that it contains a small quantity of a metal, in this case aluminium, in a proportion of approximately 10 at.%; this "doping" makes it possible to increase the resistance of the $Si_3N_4$ layer to corrosive species likely to be present in the atmosphere where the subsequent heat treatment of the substrate is carried out, in particular species of the $Na_2O$ type.

Finally, an Example 5 was produced, similar to Example 4, but using under the first silver layer (3) not an $SnO_2$/ZnO sequence but an $Si_3N_4$/ZnO sequence. Furthermore, it was chosen to affix to each of the silver layers (3) and (6) not only Ti sacrificial layers (4) and (7) on top of them but also thin layers, called (2c) and (2c') below, also made of Ti, just below them. However, it should be noted that advantageous stacks are also produced without these Ti sacrificial layers (4), (7) and/or without these Ti sublayers (2c)—they are therefore optional.

Table 5 is the succession of layers:

TABLE 5

| | | EXAMPLE 5 |
|---|---|---|
| Glass | (1) | — |
| $SnO_2$ | (2a) | 9 |
| ZnO | (2b) | 21 |
| Ti | (2c) | 1 |
| Ag | (3) | 9 |
| Ti | (4) | 1 |
| ZnO | (5a') | 16 |
| $Si_3N_4$ | (5a) | 57 |
| ZnO | (5b) | 16 |
| Ti | (2c') | 1 |
| Ag | (6) | 10 |
| Ti | (7) | 1 |
| ZnO | (8a) | 20 |
| $Si_3N_4$ | (8b) | 18 |

In this particular case there is again the $Si_3N_4$ barrier layer (8b) and, as in Example 4, a non-porous or hardly porous ZnO "stabilizing" layer (8a), the effect of which may be improved by the presence of the subjacent layer (5b) of ZnO which is also non-porous or hardly porous.

Example 5a consisted in producing an example identical to Example 5, but by "doping", as in Example 4a, the $Si_3N_4$ final layer 8a with aluminium.

The invention therefore makes it possible to combine two very significant advantages when these stacks are intended to undergo heat treatments, by an advantageous combination of two types of layers intended to "contain" the silver layers and to preserve the integrity of their constituent material.

This application is based on French Priority Application FR96/15265, filed in the French Patent Office on Dec. 12, 1996, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

We claim:

1. A glazing assembly comprising at least one transparent glass substrate and a stack of thin layers thereon, wherein said stack of thin layers comprises n functional layers having reflection properties in the infrared, in solar radiation or in both, and (n+1) coatings, wherein said coatings comprise one or more layers, at least one of which is made of a dielectric material, said functional layers and said coatings alternating so that each functional layer is placed between two coatings, wherein n≧1;

wherein, when the substrate is subjected to a heat treatment selected from the group consisting of toughening, bending and annealing, in order to preserve the optical quality of the stack at least one of the following must be satisfied:

the coating placed on top of at least one of the functional layers includes at least one barrier layer comprising a material forming a barrier to at least oxygen and water, wherein said material is selected from the group consisting of $SiO_2$, $SiO_xC_y$, $SiO_xN_y$, $Si_3N_4$, and mixtures thereof; or at least one absorbent layer comprising a material capable of absorbing the constituent material of said functional layer or a layer that is stabilizing with respect to said constituent material forms at least a part of:

(a) either the coating placed on top of the functional layer or under the barrier layer; or (b) the coating placed under the functional layer.

2. The glazing assembly according to claim 1, wherein at least one of said n functional layers comprises a metal layer.

3. The glazing assembly according to claim 1, wherein the stack is a single functional layer placed between two coatings.

4. The glazing assembly according to claim 1, wherein the stack has two functional layers alternating with three coatings.

5. The glazing assembly according to claim 1, wherein at least one of the functional layers is made of silver or of a metal alloy containing silver.

6. The glazing assembly according to claim 1, wherein the barrier layer has a geometrical thickness greater than or equal to 10 nm.

7. The glazing assembly according to claim 1, wherein the absorbent layer is made of a porous material.

8. The glazing assembly according to claim 7, wherein the porous absorbent layer has a geometrical thickness of at least 2 nm.

9. The glazing assembly according to claim 7, wherein the porous absorbent layer consists essentially of a metal selected from the group consisting of Ni, Cr, Nb, Sn, Ti, NiCr alloys and steel.

10. The glazing assembly according to claim 9, wherein said porous absorbent layer has a thickness of from 2 to 5 nm.

11. The glazing assembly according to claim 7, wherein said porous absorbent layer is made of a dielectric material.

12. The glazing assembly according to claim 1, wherein the absorbent layer is an insertion absorbent layer made of a material capable of reversibly or irreversibly inserting metal cations from the n functional layer(s).

13. The glazing assembly according to claim 12, wherein said metal cations are $Ag^+$ cations.

14. The glazing assembly according to claim 12, wherein the insertion absorbent layer has a thickness greater than or equal to 1 nm.

15. The glazing assembly according to claim 1, wherein the absorbent layer consists essentially of a metal or a metal alloy capable of forming a defined or non-defined solid solution with a metal of the functional layer.

16. The glazing assembly according to claim 1, wherein at least one of the functional layers is surmounted by a sacrificial metallic layer which is at least partially oxidized and has a thickness of from 0.5 to 4 nm.

17. The glazing assembly according to claim 1, wherein the absorbent layer comprises a metal and forms part of the coating placed on top of, and directly in contact with, the functional layer and directly in contact with it, and the absorbent layer also acts as a sacrificial layer.

18. The glazing assembly according to claim 1, wherein the stabilizing layer comprises zinc oxide, and has a geometrical thickness of at least 5 nm.

19. The glazing assembly according to claim 1, wherein the stabilizing layer forms part of the coating placed on top of the functional layer, and is directly in contact with the functional layer or separated from the functional layer by a thin sacrificial layer.

20. The glazing assembly according to claim 1, wherein the stack comprises two functional layers, each of which is associated with a barrier layer and an absorbent layer.

21. The glazing assembly according to claim 1, wherein at least one of the barrier layers is under the coating of at least one other layer made of $Si_3N_4$ or a metal oxide selected from the group consisting of ZnO, $SnO_2$, $TiO_2$, $Nb_2O_5$, $Ta_2O_5$, $Al_2O_3$, $WO_3$, and mixtures thereof.

22. The glazing assembly according to claim 1, wherein at least one of the functional layers is placed on a coating, a final layer of which facilitates wetting of the functional layer, wherein the final layer is made of an oxide selected from the group consisting of $Ta_2O_5$, $Nb_2O_5$ and ZnO.

23. The glazing assembly according to claim 1, wherein at least one of the functional layers is surmounted by a coating sequence of $SnO_2/Si_3N_4$, $WO_3/Si_3N_4$, or $ZnO/Si_3N_4$.

24. The glazing assembly according to claim 1, wherein at least one of the functional layers is placed on top of a layer of $WO_3$, $SnO_2$ or ZnO and beneath a layer made of $Si_3N_4$, AlN or a mixture of $Si_3N_4$ and AlN.

25. The glazing assembly according to claim 1, wherein at least one of the functional layers is on top of a coating sequence of $ZnO/Si_3N_4/ZnO$.

26. The glazing assembly according to claim 1, wherein at least one of the functional layers is on top of a coating sequence comprising $SnO_2/ZnO$ or $Si_3N_4/ZnO$.

27. The glazing assembly according to claim 1, wherein at least one of the transparent substrates is made of clear or bulk-tinted glass.

28. The glazing assembly according to claim 1, wherein the assembly is laminated, combining at least two rigid glass substrates using at least one sheet of a thermoplastic polymer, with a laminate structure of glass substrate/stack of one or more thin layers of thermoplastic polymer/glass substrate.

29. The glazing assembly according to claim 1, wherein the assembly is an asymmetric laminated glazing, combining a rigid glass substrate with at least one sheet of polyurethane-based polymer having energy absorption properties, with a laminate structure comprising glass substrate/stack of one or more thin layers of polyurethane based polymer.

30. The glazing assembly according to claim 1, wherein the glazing assembly is curved.

31. The glazing assembly according to claim 1, wherein the assembly is mounted as a monolithic assembly or as a double-glazing unit, wherein at least the substrate carrying the stack is made of toughened glass.

32. The glazing assembly according to claim 1, wherein the assembly has a light transmission, $T_L$, of from 50 to 85%, and a light reflectance, $R_L$, of less than 20%.

33. The glazing assembly according to claim 32, wherein the assembly has negative values of a* and b* in external reflection.

34. The glazing assembly of claim 1, wherein the layers have the following thicknesses:

the barrier layer has a geometrical thickness greater than or equal to 10 nm;

the absorbent layer has a geometrical thickness greater than or equal to 1 nm; and the stabilizing layer has a geometrical thickness of at least 5 nm.

35. A process for preparation of a glazing assembly in accordance with claim 1, comprising:

depositing one or more layers of the stack of layers on the substrate by vacuum sputtering, optionally in the presence of a magnetic field and subjecting the resulting product to a heat treatment selected from the group consisting of bending, toughening and annealing without impairing its optical quality.

36. A glazing assembly comprising at least one transparent glass substrate and a stack of thin layers thereon, wherein said stack of thin layers comprises n functional layers having reflection properties in the infrared, in solar radiation or in both, and (n+1) coatings, wherein said coatings comprise one or more layers, at least one of which is made of a dielectric material, said functional layers and said coatings alternating so that each functional layer is placed between two coatings, wherein n≧1, said stack of thin layers containing at least one barrier layer and at least one absorbent layer, wherein the at least one absorbent layer is a porous absorbent layer consisting essentially of a metal selected from the group consisting of Ni, Cr, Nb, Sn, Ti, NiCr alloys and steel;

wherein, when the substrate is subjected to a heat treatment selected from the group consisting of toughening, bending and annealing, in order to preserve the optical quality of the stack at least one of the following must be satisfied:

the coating placed on top of at least one of the functional layers includes at least one barrier layer comprising a material forming a barrier to at least oxygen and water; or at least one absorbent layer comprising a material capable of absorbing the constituent material of said functional layer or a layer that is stabilizing with respect to said constituent material forms at least a part of:

(a) either the coating placed on top of the functional layer or under the barrier layer; or (b) the coating placed under the functional layer.

* * * * *